United States Patent Office 2,799,887
Patented July 23, 1957

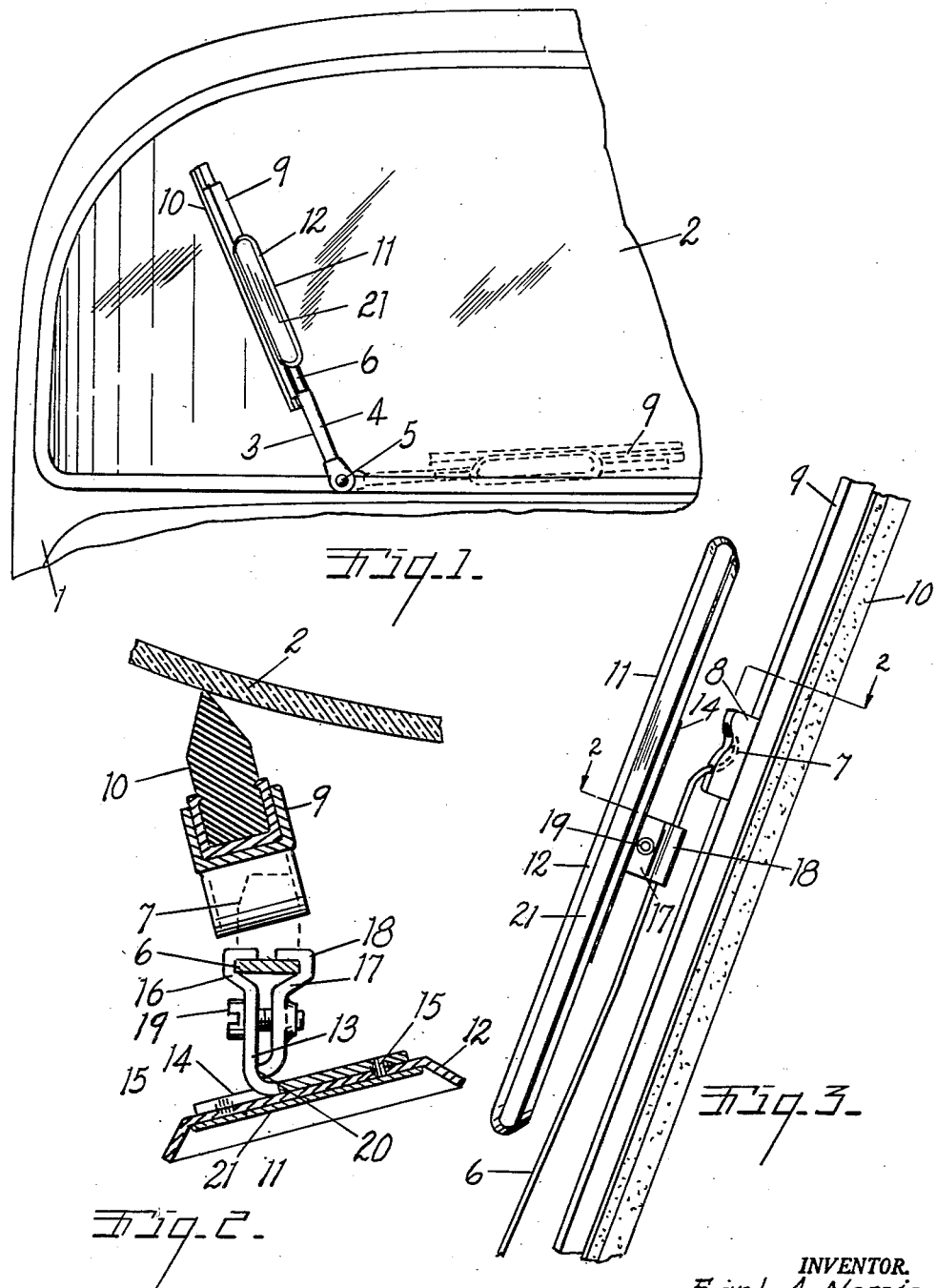

2,799,887

WINDSHIELD WIPER AND SIGNAL

Earl A. Nemic, Grand Rapids, Mich.

Application March 18, 1954, Serial No. 417,075

11 Claims. (Cl. 15—255)

This invention relates to windshield wiper and signal.

The main objects of this invention:

First, to provide a windshield wiper which is efficient under varying conditions of wind thrust or impact and also rain impact.

Second, to provide a windshield wiper having these advantages which also serves as a signal when viewed from the front of the windshield.

Third, to provide an attachment for windshields having these advantages which may readily be applied to or embodied in types of wipers now in extensive use.

Objects relating to details and economies of the invention will appear from the description to follow. The invention is defined and pointed out in the claims.

A preferred embodiment of the invention is ilustrated in the acompanying drawing, in which:

Fig. 1 is a fragmentary front perspective view of a windshield with the wiper of my invention associated therewith, certain parts being shown conventionally and the operating means for the wiper not being illustrated.

Fig. 2 is an enlarged sectional view on a line corresponding to line 2—2 of Fig. 3.

Fig. 3 is a fragmentary view looking from the left of Fig. 2.

It is a matter of common experience that under certain wind and rain conditions and when motor vehicles are driven at high speeds the wind thrust or pressure affects the efficiency of the windshield wiper. Also, that the efficiency of the windshield wiper is affected in certain rain storm conditions. It is also recognized that a moving signal attracts more attention than a stationary signal and in my preferred embodiment illustrated I provide means for accomplishing both ends.

In the accompanying drawing 1 represents a motor vehicle and 2 a curved windshield. The windshield wiper designated generally by the numeral 3 comprises an arm 4 pivotally mounted at 5 to be oscillatingly driven. The driving means is not illustrated as it forms no part of this invention.

The arm 4 is provided with an outer springable section 6 terminating in a hook-like portion 7 engageable with the socket 8 on the windshield blade holder 9 in which the resilient blade 10 is mounted.

I provide an elongated wind and rain impact or thrust member 11 having a forwardly flaring rim 12. To the rear side of the member 11 I secure a rearwardly projecting bracket member 13, the base or attaching plate 14 of which is welded to the member 13 as indicated at 15. This bracket member 13 is conformed to provide a laterally facing recessed jaw 16 fittingly engaging one edge of the resilient outer portion of the wiper arm.

The opposed coacting jaw member 17 has a jaw 18 engaging the opposite edge of the arm section 6. The jaws are clamped upon the wiper arm by the screw 19 disposed through the bracket member and threaded into the jaw member 17 which is fulcrumed on the bracket member at 20. The device may be quickly and easily and at the same time securely mounted on the wiper arm and is adjustable longitudinally of the arm to adapt it to particular wipers and windshields and conditions. Thus mounted the member 11 acts to hold the wiper blade against the windshield under varying conditions of wind impact due to high wind or impact caused by high speeds or both and also in driving against rain.

There is a tendency for the central portion of the wiper blade to become ineffective under varying conditions, that is, to lose its wiping contact with the windshield and this zone is commonly the vision zone of the driver.

The light reflecting member 21 which may be a sheet of light reflecting fabric such, for example, as is called "Scotch-Lite" is secured to the face of the member 11 and is protected by the rim thereof. It is desired to state however that luminous paint may be used. This provides an effective and moving signal, that is, moving when the wiper is in operation under rain or snow conditions when visibility is reduced so it serves as a desirable safety factor. It is also desirable as a signal when the wiper is not moving.

I have illustrated only one embodiment of my invention as it is believed that it will enable those skilled in the art to adapt my invention as may be desired in windshield wipers having different structural details. However, the type illustrated is believed to be most commonly used.

Having thus described my invention, what I claim as new and desire to secure by Letters Patent is:

1. A windshield wiper comprising an arm adapted to be oscillatingly driven, said arm having a portion at its outer end springably resilient transversely to the path of travel of the arm, a blade holder provided with a blade and mounted for longitudinal tilting movement on said springably resilient portion of the arm, an elongated wind thrust member having a face of substantial area provided with an outwardly flaring rim mounted on said springable portion of said arm to face forwardly and in forwardly spaced relation to the blade, and a light reflecting member secured to the outer side of said wind thrust member within the outwardly flared rim portion.

2. A windshield wiper comprising an arm adapted to be oscillatingly driven, said arm having a portion at its outer end springably resilient transversely to the path of travel of the arm, a blade holder provided with a blade and mounted for longitudinal tilting movement on said springably resilient portion of the arm, an elongated wind thrust member having a face of substantial area provided with an outwardly flaring rim mounted on said springable portion of said arm to face forwardly and in forwardly spaced relation to the blade.

3. A windshield wiper comprising an arm adapted to be oscillatingly driven, said arm having a portion at its outer end springably resilient transversely to the path of travel of the arm, a blade holder provided with a blade and mounted for longitudinal tilting movement on said springably resilient portion of the arm, a wind thrust member having a face of substantial area provided with an outwardly flaring rim, and a bracket on the rear side of said member provided with a coacting pair of jaws conformed to receive said springable portion of said arm and provided with a screw for adjustably clamping the jaws to the arm and supporting the said wind thrust member in forwardly spaced and forwardly facing relation relative to the blade.

4. A windshield wiper comprising an arm adapted to be oscillatingly driven, said arm having a portion at its outer end springably resilient transversely to the path of travel of the arm, a blade holder provided with a blade and mounted for longitudinal tilting movement on said springably resilient portion of the arm, a wind thrust member having a face of substantial area, and a bracket on the rear side of said member provided with opposed coacting jaws clampingly engaging said springable portion of said arm and supporting the said wind thrust member in forwardly spaced and forwardly facing relation relative to the blade.

5. A windshield wiper comprising an arm adapted to be oscillatingly driven, a blade holder tiltably mounted on the outer end of said arm, an elongated relatively narrow forwardly facing wind thrust member disposed forwardly of said arm and in approximately longitudinal alignment therewith, and means having clamping engagement with said arm for adjustably and nontiltably securing said wind thrust member to the arm independently of the connection of the blade holder to the arm.

6. A windshield wiper comprising an arm adapted to be oscillatingly driven, a blade tiltingly mounted on the outer end of said arm, and an elongated relatively narrow wind thrust member having a face of substantial area nontiltably mounted on the swinging end of said arm independently of the connection to the blade to said arm and positioned forwardly of and in approximately longitudinal alignment with said arm.

7. A windshield wiper comprising an arm adapted to be oscillatingly driven, a blade disposed rearwardly of and mounted on the outer end of said arm, and an elongated relatively narrow wind thrust member having a face of substantial area disposed forwardly of and nontiltably mounted in forwardly facing relation on the swinging end of said arm and in approximately longitudinal alignment with the arm and independently of the connection of the blade carried by the arm.

8. A windshield wiper comprising an arm adapted to be oscillatingly driven, a wiper blade disposed on the rear side of said arm and tiltably mounted on the outer end thereof to be oscillated therewith, an elongated relatively narrow wind thrust member having a face of substantial area disposed in forwardly facing relation forwardly of said arm and nontiltably mounted on the swinging end of the arm.

9. An attachment for a windshield wiper including a blade comprising a wind thrust member having an elongated face of substantial area and having an outwardly flaring rim, a bracket on the rear side of said member provided with clamping jaws adjustably engageable with the arm of a windshield wiper to support said wind thrust member in forwardly spaced and forwardly facing aligned relation to the blade of the wiper and a light reflecting member secured on the outer side of said windshield thrust member within the outwardly flared rim portion.

10. An attachment for a windshield wiper including a blade comprising a plate-like wind thrust member of substantial area, a bracket fixedly mounted on the rear side of said member and adjustably engageable with the arm of a windshield wiper to support the wind thrust member in forwardly facing and forwardly spaced relation to the blade of the wiper and independent thereof, and a light reflecting material on the outer side of said member.

11. A windshield wiper comprising an arm adapted to be oscillatingly driven, a wiper blade disposed on the rear side of said arm and tiltably mounted on the outer end thereof to be oscillated therewith, said arm having an elongated relatively narrow dished wind thrust member thereon and extending longitudinally thereof and positioned in front of said wiper blade.

References Cited in the file of this patent

UNITED STATES PATENTS

| 1,894,186 | McCord | Jan. 10, 1933 |
| 1,946,009 | Besson | Feb. 6, 1934 |
| 2,407,680 | Palmquist et al. | Sept. 17, 1946 |

FOREIGN PATENTS

| 402,189 | Great Britain | Nov. 30, 1933 |